United States Patent
Schmidt et al.

(10) Patent No.: US 7,168,828 B2
(45) Date of Patent: Jan. 30, 2007

(54) MULTICOLORED LED VEHICLE INTERIOR LIGHT

(75) Inventors: Glenn T. Schmidt, Selden, NY (US); Amy Grumet-Avallone, Smithtown, NY (US); Samuel Zeng, Flushing, NY (US); Lajos Meszaros, West Babylon, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/246,470

(22) Filed: Oct. 7, 2005

(65) Prior Publication Data

US 2006/0158892 A1    Jul. 20, 2006

Related U.S. Application Data

(60) Provisional application No. 60/616,974, filed on Oct. 8, 2004.

(51) Int. Cl.
- *B64D 47/02* (2006.01)
- *F21V 5/00* (2006.01)
- *F21V 23/04* (2006.01)
- *H05B 33/00* (2006.01)

(52) U.S. Cl. .............. 362/471; 362/231; 362/244; 362/251; 362/394; 362/800

(58) Field of Classification Search ............... 362/471, 362/251, 394, 230, 231, 244
See application file for complete search history.

(56) References Cited

U.S. PATENT DOCUMENTS

| | | | |
|---|---|---|---|
| 2,537,971 A * | 1/1951 | Dames, Jr. ............. 362/471 |
| 4,329,740 A * | 5/1982 | Colvin ................... 362/231 |
| 4,947,291 A * | 8/1990 | McDermott ............ 362/231 |
| 4,962,687 A | 10/1990 | Bellieveau et al. |
| 5,677,603 A | 10/1997 | Speirs et al. |
| 5,713,654 A | 2/1998 | Scifres |
| 5,785,418 A | 7/1998 | Hochstein |
| 5,803,579 A | 9/1998 | Turnbull et al. |
| 6,016,038 A * | 1/2000 | Mueller et al. ......... 315/291 |
| 6,132,072 A | 10/2000 | Turnbull et al. |
| 6,152,588 A | 11/2000 | Scifres |
| 6,268,702 B1 * | 7/2001 | Fleck ..................... 362/231 |
| 6,335,548 B1 | 1/2002 | Roberts et al. |
| 6,441,943 B1 | 8/2002 | Roberts et al. |
| 6,523,976 B1 | 2/2003 | Turnbull et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,609,812 B2 * | 8/2003 | Machi et al. ........... 362/231 |
| 6,614,336 B2 * | 9/2003 | Galli ...................... 335/205 |
| 6,623,151 B2 | 9/2003 | Pederson |
| 6,624,597 B2 | 9/2003 | Dowling et al. |
| 6,672,745 B1 | 1/2004 | Bauer et al. |
| 6,932,495 B2 | 8/2005 | Sloan et al. |
| 7,023,004 B2 * | 4/2006 | Ford et al. ............. 250/495.1 |
| 7,114,823 B2 * | 10/2006 | McCullough et al. ... 362/105 |
| 2003/0011538 A1 | 1/2003 | Lys et al. |

(Continued)

*Primary Examiner*—Alan Cariaso
(74) *Attorney, Agent, or Firm*—Gardner Carton & Douglas LLP

(57) ABSTRACT

A multicolored LED vehicle interior light is described. In various implementations, a switch is used to select one of a plurality of LED lights, in which one light is of a color, such as red, which is suitable for preserving night vision.

13 Claims, 2 Drawing Sheets

U.S. PATENT DOCUMENTS

| | | |
|---|---|---|
| 2003/0048641 A1 | 3/2003 | Alexanderson et al. |
| 2003/0057887 A1 | 3/2003 | Dowling et al. |
| 2003/0057890 A1 | 3/2003 | Lys et al. |
| 2003/0072157 A1 | 4/2003 | Nolan et al. |
| 2003/0133292 A1 | 7/2003 | Mueller et al. |
| 2003/0156425 A1 | 8/2003 | Turnbull et al. |
| 2003/0227774 A1 | 12/2003 | Martin et al. |
| 2004/0032745 A1 | 2/2004 | Pederson |
| 2004/0052076 A1 | 3/2004 | Mueller et al. |

* cited by examiner

MULTICOLORED LED VEHICLE INTERIOR LIGHT

CROSS-REFERENCE TO RELATED APPLICATIONS

This application claims the benefit of the filing date of U.S. Provisional Application No. 60/616,974, filed Oct. 8, 2004, which is incorporated by reference herein in its entirety.

FIELD OF THE INVENTION

This invention relates to interior vehicle lighting and, more particularly, to interior vehicle lighting that uses light-emitting diodes (LEDs) of different colors.

BACKGROUND OF THE INVENTION

Conventional vehicle interior lights, or chart lights, which employ movable colored filters in combination with a white light source are generally known. These existing chart lights use colored filters deployed in front of a white light source to convert white light to colored light. For example, red filters are sometimes used with a white light source at night in order to prevent the momentary blindness that white light causes in a dark environment.

The filter used in existing chart lights is a disk which is positioned with its edge toward the light source when white light is required. To change from white light to red light, the pilot or cockpit crew would rotate the front bezel of the unit, which would active a pin/slot combination to rotate the red plastic disk across the light source.

Problems exist with conventional light charts, such as the poor reliability of some filters causing an inability to change colors and the relatively short lifespan of conventional light sources. Thus, a need exists for an improved vehicle interior light.

BRIEF SUMMARY OF THE INVENTION

To address the foregoing problems, a multicolored LED vehicle interior light is provided. According to an embodiment of the invention, the light includes a plurality of light-emitting diodes, including a first light-emitting diode and a second light-emitting diode, wherein each of the first and second light-emitting diodes emit light of a different color than the other. The light may also include a switch having a plurality of positions including a first position and a second position, wherein, when the switch is in the first position, the first light-emitting diode is illuminated and the second light-emitting diode is not illuminated, and when the switch is in the second position, the second light-emitting diode is illuminated and the first light-emitting diode is not illuminated. In one embodiment, the first light emitting diode emits red light when illuminated, and the second light emitting diode emits white light when illuminated. The light may also have a rotating bezel that is connected to the housing and is mechanically coupled to the switch, such that when the bezel is rotated to the first position, the switch creates an electrical path between the input unit and the first light-emitting diode.

DETAILED DESCRIPTION OF THE INVENTION

Figure 1:
FIG. 1 is a section view of a securing nut for an embodiment of the invention.
Figure 2:
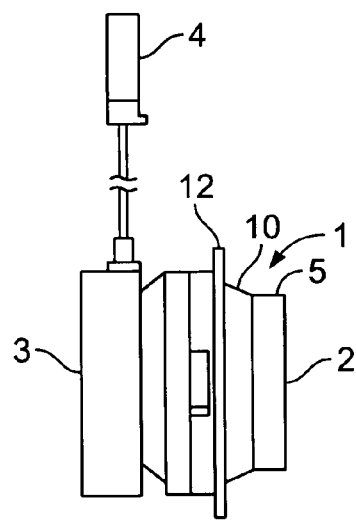
FIG. 2 is a side view of the components of an embodiment of the invention.
Figure 3:
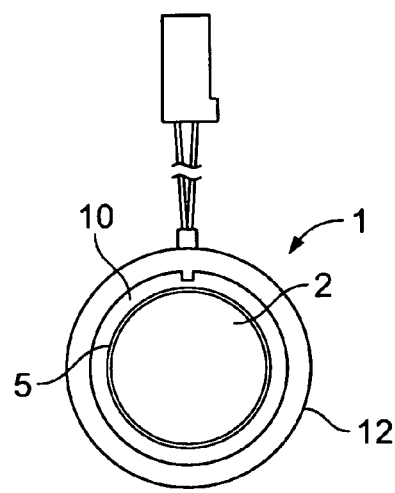
FIG. 3 is a front view of an embodiment of the invention.

The invention generally directed to multicolored LED vehicle interior light. Referring to FIGS. 2 and 3, an embodiment of the light is shown. The light includes a housing 1, a rotating bezel 5 connected to the housing 1, a lens 2 coupled to the rotating bezel 5, and an LED module 3. The light also includes a generally frusto-conical exterior portion 10 and a lip 12. The lip 12 is disposed annularly about one end of the frusto-conical portion 10, and the rotating bezel 5 is attached to the other end of the frusto-conical portion 10. The light is coupled to a power input unit 4, which provides power to the light. The LED module 3 includes at least two LEDs, each illuminating with a different color. The lens 2 focuses the light emitted by the LEDs. This lens may be composed of glass or of other materials which are known to those of ordinary skill in the art as appropriate for use as a lens. The light also includes a switch that permits a user to turn off one of the plurality of LEDs and turn on another of the plurality. The switch may be coupled to the rotating bezel 5.

Figure 4:
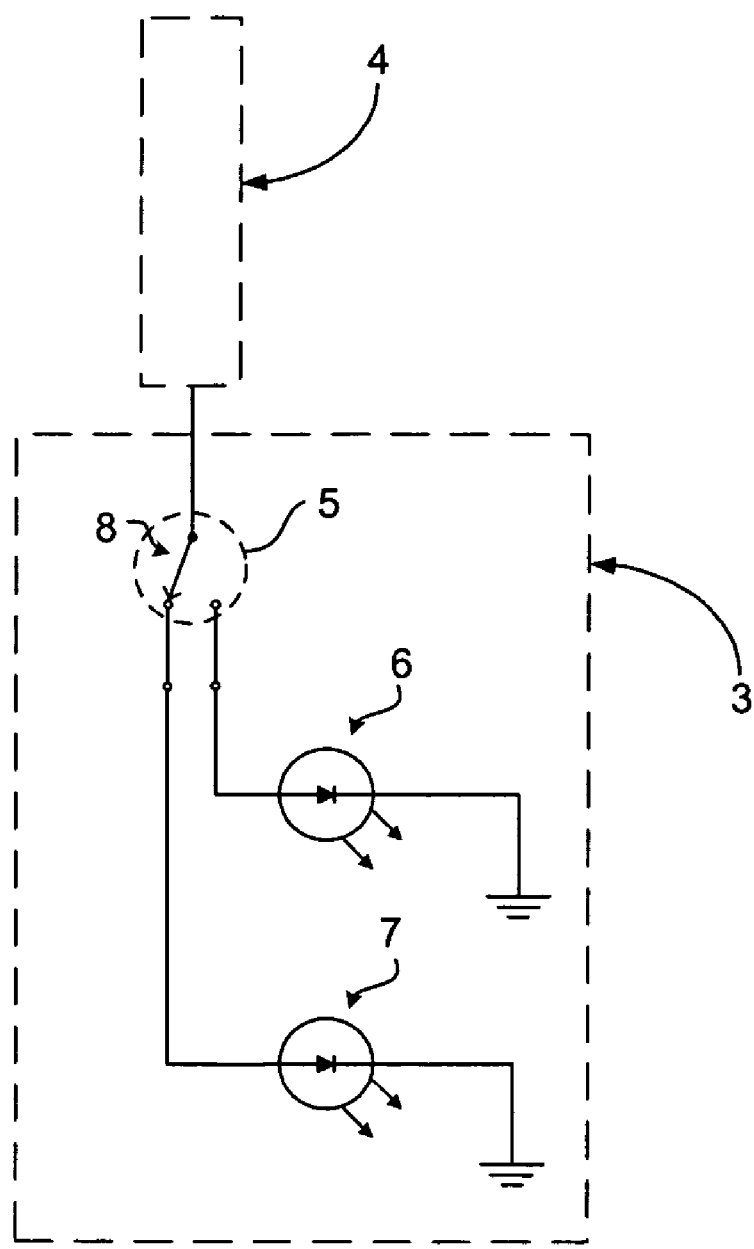
FIG. 4 is an electrical schematic of an embodiment of the invention.

Referring to FIG. 4, an electrical layout of the light according to an embodiment of the invention will now be described. In this embodiment, the LED module 3 includes a first LED 6 and a second LED 7, and a switch 8. The switch 8 is electrically coupled to the power input unit 4 and to the LEDs via connectors, which may be pins, wire, or any other type of connector. The switch 8 has a first position, in which the switch permits current to flow from the power input unit 4 to the first LED 6, and a second position, in which the switch 8 permits current to flow from the power input unit 4 to the second LED 7. In addition to being coupled to the switch 8, the first and second LEDs 6 and 7 are also connected to ground. The switch 8 is mechanically coupled to the rotating bezel 5, so that when a user rotates the bezel 5, the switch 8 moves from the first position to the second position or vice versa.

In an embodiment of the invention, each the plurality of LEDs of the LED module 3 emits a different color of light from the other LEDs of the plurality. By way of example, one LED may be red and another white. Using separate red and white LEDs activated by an internal switch completely eliminates the need for a red filter. As can be appreciated by one of ordinary skill in the art, the colors of the light emitted by the LED-based chart lights are not inherently limited to red and white. LEDs which emit light in other colors exist and may be used in practicing this invention.

In one embodiment of the present invention, the LED-based light source may be used in a vehicle. More particularly, it may be used within the operator's compartment of an automobile or an aircraft as a reading aid or as a chart light. When implemented as a chart light, the present invention is more reliable than the conventional chart lights because fragile filter disks are not part of the design. The lack of glass filter disks also results in a decrease in weight, which is particularly advantageous for aircraft. The fact that the present invention uses solid state technology improves its lifespan as compared to conventional lights. Additionally, it consumes less power than conventional light sources.

When implemented as a chart light in an aircraft cockpit, the invention has the additional advantage of reducing the protrusion into the cockpit space as compared to conventional chart lights. Furthermore, the invention provides a more even light pattern by eliminating the intruding shadows associated with the hardware that was necessary to support the filter disks in conventional chart lights, and minimizes the disruption to established ergonomics and routines.

In one embodiment, the present invention may also be used to supply emergency lighting.

It can thus be seen that a new and useful multicolored LED vehicle light has been described. It should be noted that the use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are examples only, and should not be taken as limiting the scope of the invention.

What is claimed is:

1. An aircraft cockpit light comprising:
   a housing comprising a generally frusto-conical exterior portion and a lip that is disposed annularly about a first end of the frusto-conical portion;
   a rotating bezel attached to a second end of the frusto-conical portion;
   a lens coupled to the bezel;
   a plurality of light-emitting diodes disposed such that, when illuminated, light from the light-emitting diodes passes through the lens and is focused thereby, wherein the plurality of light-emitting diodes includes a first light-emitting diode and a second light-emitting diode, wherein each of the first and second light-emitting diodes emit light of a different color from the other; and
   a switch coupled to the bezel, wherein when the bezel is rotated to a first position, the switch permits current to flow to the first light-emitting diode, but not to the second light-emitting diode, and when the bezel is rotated to a second position, the switch permits current to flow to the second light-emitting diode, but not to the first light-emitting diode.

2. The light of claim 1, wherein the light is disposed within an aircraft cockpit.

3. The light of claim 1, wherein the first light-emitting diode emits red light when illuminated and the second light emitting diode emits white light when illuminated.

4. The light of claim 1, wherein the first light-emitting diode emits a light that is suitable for preserving night vision.

5. The light of claim 1, further comprising an input unit electrically coupled to the switch.

6. The light of claim 5, wherein when the bezel is rotated to the first position, the switch creates an electrical path between the input unit to the first light-emitting diode.

7. The light of claim 6, wherein when the bezel is rotated from the first position to the second position, the switch breaks the electrical path between the input unit and the first light-emitting diode and creates an electrical path between input unit and the second light-emitting diode.

8. The light of claim 7, wherein the first light-emitting diode emits red light when illuminated and the second light emitting diode emits white light when illuminated.

9. The light of claim 8, wherein the light is disposed within an aircraft cockpit.

10. The light of claim 9, wherein the first light-emitting diode emits red light when illuminated and the second light emitting diode emits white light when illuminated.

11. A lighting system comprising:
    an aircraft cockpit;
    a reading light disposed within the aircraft cockpit, the reading light comprising:
      a housing comprising a generally frusto-conical exterior portion and a lip that is disposed annularly about a first end of the frusto-conical portion:
      a rotating bezel attached to a second end of the frusto-conical portion;
      a lens coupled to the bezel;
      a plurality of light-emitting diodes disposed such that, when illuminated, light from the light-emitting diodes passes through the lens and is focused thereby, wherein the plurality of light-emitting diodes includes a first light-emitting diode and a second light-emitting diode, wherein each of the first and second light-emitting diodes emit light of a different color from the other, wherein the second light-emitting diode emits light of a color that inhibits the loss of night vision; and
    a switch coupled to the bezel, wherein when the bezel is rotated to a first position, the switch permits current to flow to the first light-emitting diode, but not to the second light-emitting diode, and when the bezel is rotated to a second position, the switch permits current to flow to the second light-emitting diode, but not to the first light-emitting diode.

12. The lighting system of claim 11, wherein the first light-emitting diode emits red light when illuminated and the second light emitting diode emits white light when illuminated.

13. An aircraft cockpit light comprising:
    a rotating bezel;
    a lens coupled to the bezel;
    a plurality of light-emitting diodes, consisting of a red light-emitting diode and a white light-emitting diode, the red and white light-emitting diodes disposed such that, when illuminated, light from the light-emitting diodes passes through the lens and is focused thereby; and
    a switch coupled to the bezel, the bezel having a first position and a second position, wherein when the bezel is rotated to the first position, the switch permits current to flow to the red light-emitting diode, but not to the white light-emitting diode, and when the bezel is rotated to the second position, the switch permits current to flow to the white light-emitting diode, but not to the red light-emitting diode.

* * * * *